United States Patent
Sasahara

(10) Patent No.: US 11,292,347 B2
(45) Date of Patent: Apr. 5, 2022

(54) ELECTRIC POWER DISTRIBUTION SYSTEM

(71) Applicant: Yazaki Corporation, Tokyo (JP)

(72) Inventor: Masato Sasahara, Susono (JP)

(73) Assignee: Yazaki Corporation, Tokyo (JP)

( * ) Notice: Subject to any disclaimer, the term of this patent is extended or adjusted under 35 U.S.C. 154(b) by 246 days.

(21) Appl. No.: 16/743,185

(22) Filed: Jan. 15, 2020

(65) Prior Publication Data

US 2020/0262301 A1 Aug. 20, 2020

(30) Foreign Application Priority Data

Feb. 19, 2019 (JP) .............................. JP2019-027596

(51) Int. Cl.
*B60L 50/00* (2019.01)
*B60L 50/60* (2019.01)
*B60L 58/12* (2019.01)

(52) U.S. Cl.
CPC ............... *B60L 50/66* (2019.02); *B60L 58/12* (2019.02); *B60L 2210/10* (2013.01)

(58) Field of Classification Search
CPC .......... B60L 50/66; B60L 58/12; B60L 53/14; B60L 50/16
See application file for complete search history.

(56) References Cited

U.S. PATENT DOCUMENTS

| 7,796,410 | B2 * | 9/2010 | Takayanagi | B60L 53/14 363/37 |
| 9,346,363 | B2 * | 5/2016 | Hatanaka | B60L 3/0092 |
| 9,796,290 | B2 * | 10/2017 | Park | B60L 58/20 |
| 9,843,184 | B2 * | 12/2017 | Origane | H02J 1/08 |
| 10,035,423 | B2 * | 7/2018 | Lasagni | H02J 7/342 |
| 10,181,750 | B2 * | 1/2019 | Maeno | H02J 7/35 |
| 2009/0179616 | A1 * | 7/2009 | Ichikawa | B60L 50/16 320/134 |
| 2011/0187184 | A1 * | 8/2011 | Ichikawa | B60L 53/14 307/10.1 |
| 2013/0200846 | A1 | 8/2013 | Ang | |
| 2014/0163854 | A1 * | 6/2014 | Matsumoto | B60L 53/665 701/123 |
| 2017/0305298 | A1 * | 10/2017 | Takeshima | B60L 3/003 |

(Continued)

FOREIGN PATENT DOCUMENTS

| EP | 2117106 A1 | 11/2009 |
| EP | 3354520 A1 | 8/2018 |
| JP | 2017-221086 A | 12/2017 |

*Primary Examiner* — Hau V Phan
(74) *Attorney, Agent, or Firm* — Banner & Witcoff, Ltd.

(57) ABSTRACT

An electric power distribution system includes a first path through which electric power is supplied to a main load; a second path through which electric power is supplied to the backup load; a third path that connects a second DC/DC converter and a first battery; a fourth path that connects the first battery and the first DC/DC converter in parallel to the main load; and a control unit that controls an output voltage of the second DC/DC converter according to an assumed output capacity derived from travel route information of a navigation system mounted on the vehicle. The assumed output capacity is a capacity that is able to supply electric power used for a driven load in the backup load, and is set to be lower than a threshold battery capacity that is lower than in a fully charged state of the second battery.

2 Claims, 7 Drawing Sheets

(56) References Cited

U.S. PATENT DOCUMENTS

| | | | |
|---|---|---|---|
| 2019/0016208 A1* | 1/2019 | Tomokage | H02K 7/006 |
| 2019/0021181 A1* | 1/2019 | Tomokage | H02K 5/10 |
| 2019/0089086 A1* | 3/2019 | Muramatsu | H01R 13/62 |
| 2019/0301377 A1 | 10/2019 | Shibata | |

* cited by examiner

FIG. 5

| TRAVEL POINT | TRAVEL AREA | BACKUP REQUIRED ELECTRIC POWER (ASSUMED OUTPUT CAPACITY) | | CHARGE AMOUNT TARGET VALUE (MAXIMUM VALUE OF ASSUMED OUTPUT CAPACITY) |
| --- | --- | --- | --- | --- |
| | | DERIVATION EXPRESSION | DERIVED RESULT | |
| S~a1 | X(0)~X(3) | Pa1-0 | 250(W) | 300(W) |
| a1~a2 | X(3)~X(7) | Pa2-Pa1 | 300(W) | |
| a2~G | X(7)~X(10) | PG-Pa2 | 50(W) | |

ELECTRIC POWER DISTRIBUTION SYSTEM

CROSS-REFERENCE TO RELATED APPLICATIONS

This application is based on and claims priority under 35 USC 119 from Japanese Patent Application No. 2019-027596 filed on Feb. 19, 2019, the contents of which are incorporated herein by reference.

TECHNICAL FIELD

The present disclosure relates to an electric power distribution system.

BACKGROUND ART

In the related art, an electric power distribution system that supplies electric power from at least one of a DC/DC converter and a battery is mounted on a vehicle such as a hybrid vehicle or an electric vehicle (EV). The electric power distribution system supplies the electric power to a load by the DC/DC converter and the battery (for example, see Patent Literature 1).

CITATION LIST

Patent Literature

Patent Literature 1: JP-A-2017-221086

SUMMARY OF INVENTION

In general, when an output current of the DC/DC converter exceeds a rated current of the DC/DC converter, output efficiency decreases due to magnetic saturation of a coil included in the DC/DC converter, and an output voltage of the DC/DC converter decreases. Therefore, in the related art as described in Patent Literature 1, for example, a 12V battery is mounted in parallel with the DC/DC converter, and the DC/DC converter and the battery are always connected. Due to such a circuit configuration, charge and discharge of the battery is controlled by the output voltage of the DC/DC converter. Therefore, since the battery is maintained in a fully charged state, deterioration of the battery is prevented if the battery is formed of a lead storage battery, but deterioration of the battery is promoted if the battery is formed of a lithium ion battery.

The present disclosure has been made in view of such a situation, and is capable of preventing deterioration of the battery.

An electric power distribution system according to one aspect of the present disclosure is mounted on a vehicle, supplies electric power to a main load from a first DC/DC converter and a first battery provided in parallel with the first DC/DC converter, and supplies electric power to a backup load from a second DC/DC converter and a second battery provided in parallel with the second DC/DC converter. The electric power distribution system includes: a first path through which electric power is supplied from at least one of the first DC/DC converter and the first battery to the main load; a second path that is provided in parallel with the first path and through which electric power is supplied from at least one of the second DC/DC converter and the second battery to the backup load; a third path that connects the second DC/DC converter and the first battery; a fourth path that connects the first path and the third path and connects the first battery and the first DC/DC converter in parallel to the main load; and a control unit that controls an output voltage of the second DC/DC converter according to an assumed output capacity derived based on travel route information of a navigation system mounted on the vehicle. The assumed output capacity is a capacity that can supply electric power used for a driven load in the backup load at a travel point that is up to midway of a moving distance of the vehicle (not shown) from a current point to a target point, and is set to be lower than a threshold battery capacity that is lower than in a fully charged state of the second battery.

In the electric power distribution system according to one aspect of the present disclosure, the travel point is included in a part of travel areas analyzed based on the travel route information, and each of the travel areas is expected to pass the vehicle during traveling and is preferably any one of a rectilinear area and an intersection area.

According to one aspect of the present disclosure, deterioration of the battery can be prevented.

BRIEF DESCRIPTION OF DRAWINGS

FIG. 5 is a diagram showing an example of a determination table of a charge amount target value according to the embodiment to which the present disclosure is applied.

DESCRIPTION OF EMBODIMENTS

Hereinafter, an embodiment of the present disclosure will be described with reference to the drawings, but the present disclosure is not limited to the following embodiment.

(Circuit Configuration)

Figure 1:
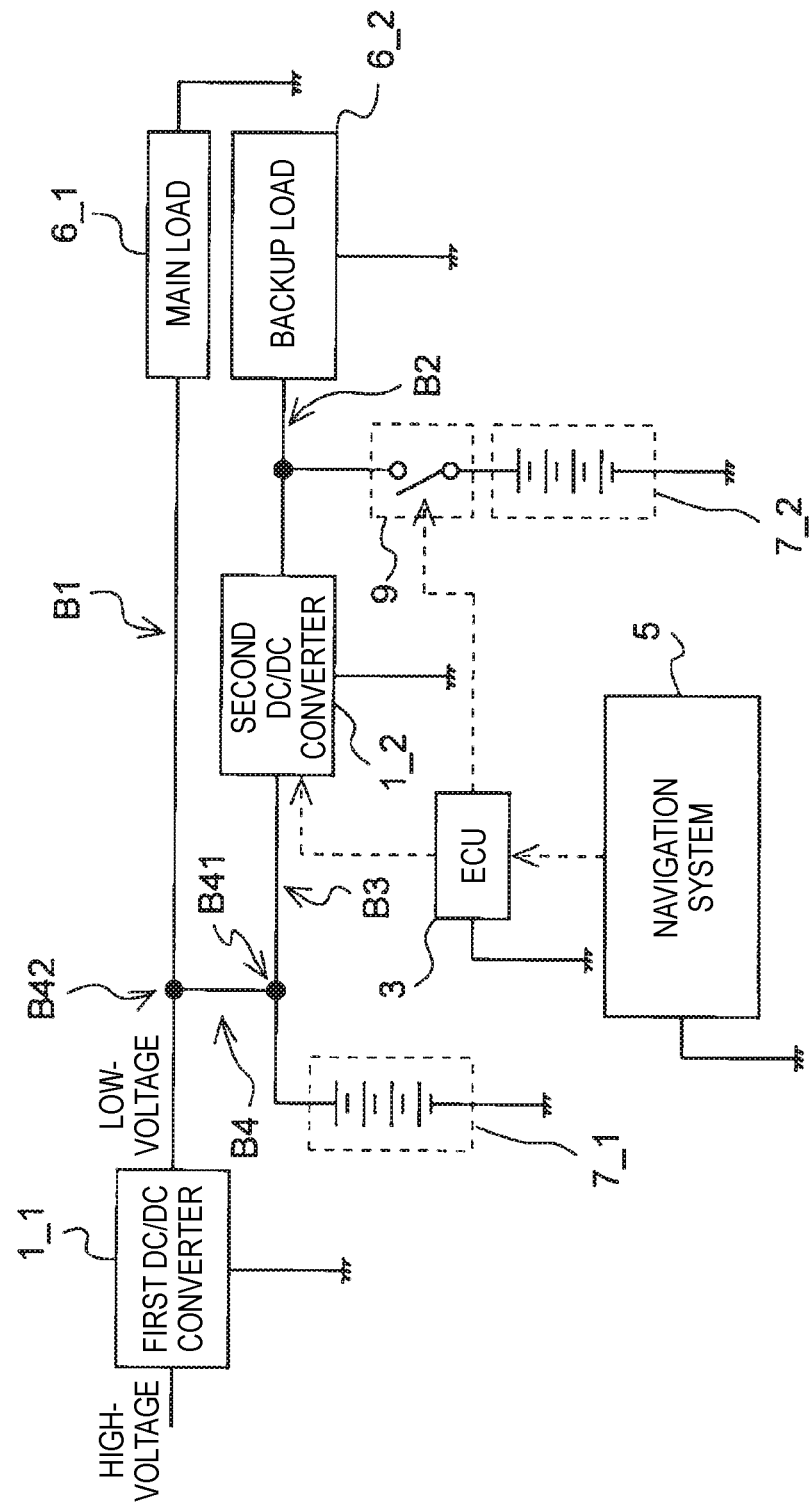
FIG. 1 is a block circuit diagram of an electric power distribution system according to an embodiment to which the present disclosure is applied.

FIG. 1 is a block circuit diagram of an electric power distribution system according to an embodiment to which the present disclosure is applied. The electric power distribution system shown in FIG. 1 is mounted on a vehicle (not shown), supplies electric power to a main load 6_1 from a first DC/DC converter 1_1 and a first battery 7_1 provided in parallel with the first DC/DC converter 1_1, and supplies electric power to a backup load 6_2 from a second DC/DC converter 1_2 and a second battery 7_2 provided in parallel with the second DC/DC converter 1_2. The vehicle (not shown) is, for example, an electric vehicle, a plug-in hybrid vehicle (PHEV), a hybrid electric vehicle (HEV) or the like.

Electric power supply destinations are the main load 6_1 and the backup load 6_2. The main load 6_1 and the backup load 6_2 include, for example, a typical load assumed in the related art and a load associated with automatic driving. The typical load is, for example, an electric power steering device, a light, a wiper or the like. In the automatic driving, for example, at a level 3 (LV3) as an automation level specified by the Japanese government or the National Highway Traffic Safety Administration (NHTSA) of the United States, a system controls all acceleration, steering and braking of a vehicle. Therefore, the load associated with the automatic driving corresponds to a load for controlling acceleration, steering and braking of the vehicle, specifically, a global positioning system (GPS), various radar devices, an imaging device, various ECUs and the like. That is, the electric power supply destination is a driven load to be driven in the main load 6_1 and the backup load 6_2. In other words, the electric power is supplied to a driven load to be driven among the main load 6_1 and the backup load 6_2 to be driven.

The main load 6_1 and the backup load 6_2 may include a load capable of continuing minimum automatic driving. For example, assuming a level 2 (LV2) as an automation level, the system is required to automatically perform a plurality of operations among acceleration, steering and braking of the vehicle, so that the load capable of continuing the minimum automatic driving is configured to realize the above operations. Therefore, the load capable of continuing the minimum automatic driving may include a load for automatically performing, by a system, a plurality of operations among acceleration, steering and braking of the vehicle, specifically, a part of a configuration for realizing the level 3 (LV3) as the automation level.

A first DC/DC converter 1_1 includes a switching circuit (not shown) and the like, and converts a high-voltage output voltage output from a motor or a generator that generates electricity by rotation of an engine into a low-voltage output voltage. Therefore, the first DC/DC converter 1_1 can output the low-voltage output voltage to the main load 6_1. The second DC/DC converter 1_2 includes a switching circuit (not shown) and the like, and can output an output voltage obtained by raising and lowering an output voltage of the first battery 7_1 controlled by the first DC/DC converter 1_1 to the backup load 6_2. Since the first DC/DC converter 1_1 has a circuit configuration connected in parallel with the first battery 7_1, the output voltage of the first battery 7_1 can be controlled. Similarly, since the second DC/DC converter 1_2 has a circuit configuration connected in parallel with the second battery 7_2, an output voltage of the second battery 7_2 can be controlled.

The first battery 7_1 and the second battery 7_2 are respectively formed of secondary batteries. Specifically, the secondary battery is a lithium ion battery. Therefore, the first battery 7_1 can supply a dark current to the main load 6_1. The second battery 7_2 can supply a dark current to the backup load 6_2. The first battery 7_1 functions as an auxiliary electric power source of the first DC/DC converter 1_1, and may also function as a backup electric power source for supplying electric power to the main load 6_1 when the first DC/DC converter 1_1 is abnormal. Similarly, the second battery 7_2 also functions as an auxiliary electric power source of the second DC/DC converter 1_2, and may also function as a backup electric power source for supplying electric power to the backup load 6_2 when the second DC/DC converter 1_2 is abnormal. Specifically, a switch 9 is provided on an upstream side of the second battery 7_2. The switch 9 is controlled to be in any one of an ON state and an OFF state. When the electric power required for backup is insufficient in the second battery 7_2, the switch 9 is controlled to be in the ON state, whereby the second battery 7_2 shifts to a charged state. When the electric power required for the backup is sufficient in the second battery 7_2, the switch 9 is controlled to be in the OFF state, whereby the second battery 7_2 shifts to a backup standby state. When an abnormality occurs in the electric power distribution system, the switch 9 is controlled to be in the ON state, thereby shifting to an electric power supply state in which electric power is supplied to the backup load 6_2. Next, the electric power distribution system will be described in detail.

As shown in FIG. 1, the electric power distribution system includes a first path B1, a second path B2, a third path B3 and a fourth path B4. The first path B1 is a main electric power supply path through which electric power is supplied from at least one of the first DC/DC converter 1_1 and the first battery 7_1 to the main load 6_1. The second path B2 is provided in parallel with the first path B1, and is a backup electric power supply path through which electric power is supplied from at least one of the second DC/DC converter 1_2 and the second battery 7_2 to the backup load 6_2. The third path B3 is a path that connects the second DC/DC converter 1_2 and the first battery 7_1. The fourth path B4 connects the first path B1 and the third path B3 by a connection point B42 of the first path B1 and a connection point B41 of the third path B3, and is a path that connects the first battery 7_1 and the first DC/DC converter 1_1 in parallel to the main load 6_1. The electric power distribution system includes an ECU3. The ECU3 includes an electric power source circuit, a driver circuit, a communication circuit, an MCU and the like (all not shown), and functions as a control unit. As shown in FIG. 1, the ECU3 can acquire various information held by a navigation system 5 mounted on the vehicle (not shown).

Figure 2:
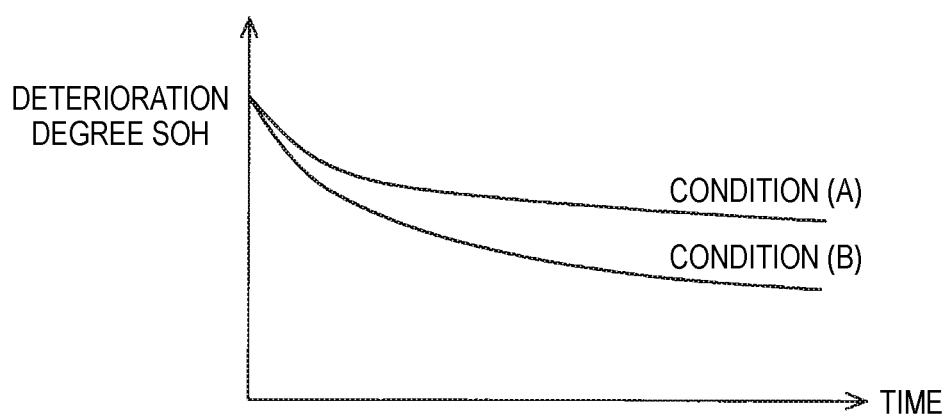
FIG. 2 is a diagram showing an example in which a state of health (SOH) varies with time depending on conditions according to the embodiment to which the present disclosure is applied.

FIG. 2 is a diagram showing an example in which a state of health (SOH) varies with time depending on conditions according to the embodiment to which the present disclosure is applied. As shown in FIG. 2, progress degree of the SOH differs between a condition (A) and a condition (B) that are used in different situations. In general, in each of the first battery 7_1 and the second battery 7_2 that are formed of lithium ion batteries, the SOH, that is, a deterioration state of the lithium ion battery progresses as a high current or a large current is generated and a state of charge (SOC) progresses. Here, the SOH is a ratio of a full charge capacity (Ah) during deterioration to an initial full charge capacity (Ah). On the other hand, the SOC is a ratio of a remaining capacity (Ah) to the full charge capacity (Ah). Therefore, when the lithium ion battery is stored in a fully charged state, deterioration is promoted. Therefore, in the present embodiment, capacity of the second battery 7_2 mounted on the vehicle (not shown) is not changed, and deterioration thereof is prevented by a method of managing the capacity of the second battery 7_2.

Figure 3:
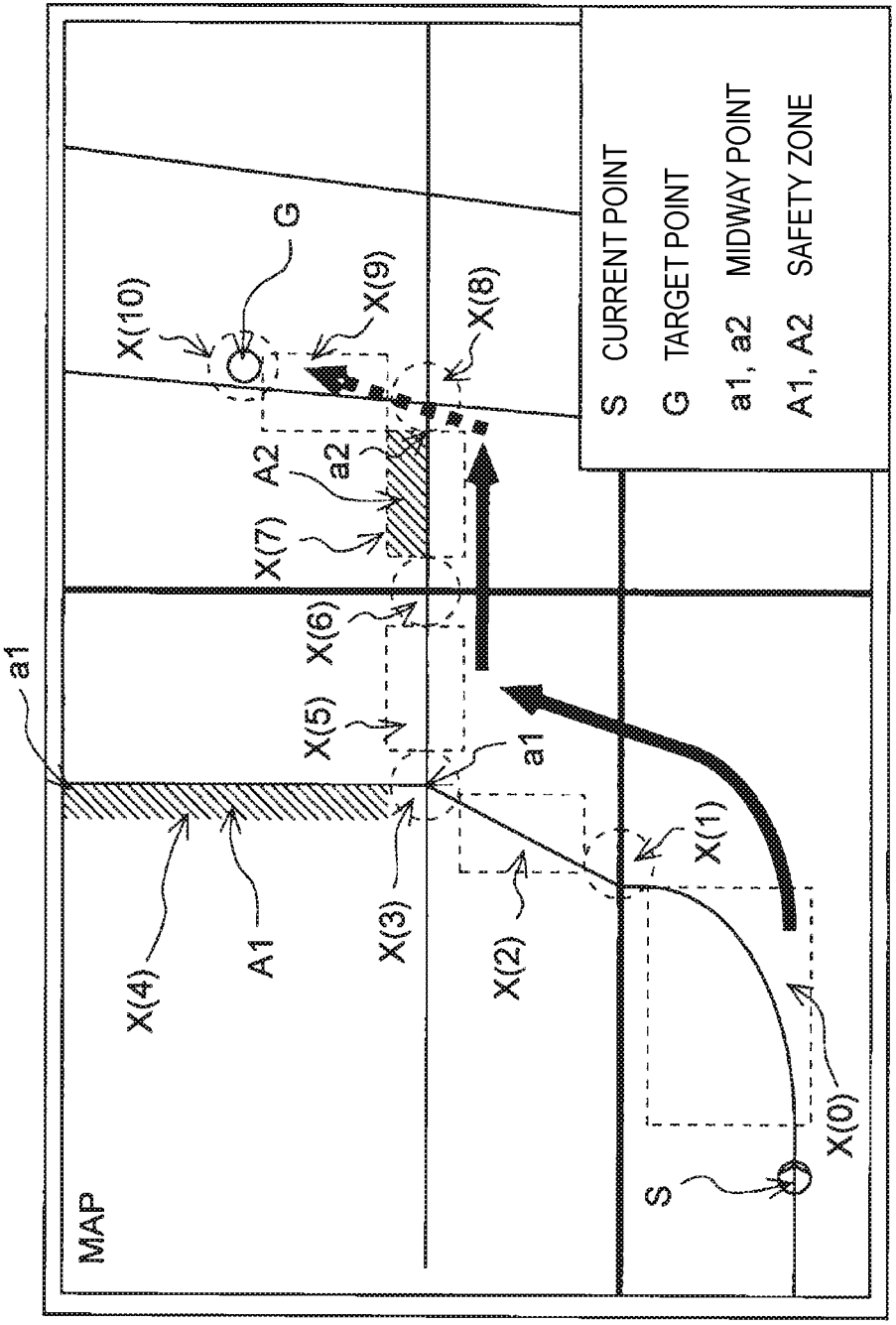
FIG. 3 is a diagram showing an example of a travel route and travel areas X(0) to X(10) of a navigation system 5 according to the embodiment to which the present disclosure is applied.

Specifically, the ECU3 controls an output voltage of the second DC/DC converter 1_2 according to assumed output capacity derived based on travel route information of the navigation system 5 mounted on the vehicle (not shown) as described above. Next, the travel route information will be described in detail with reference to FIG. 3. FIG. 3 is a diagram showing an example of a travel route and travel areas X(0) to X(10) of the navigation system 5 according to the embodiment to which the present disclosure is applied. When a person drives the vehicle (not shown) as in the related art, it is difficult for the ECU3 to predict when and that kind of load in the main load 6_1 and the backup load 6_2 is to be driven, so that it is required to always assist the first DC/DC converter 1_1 with the first battery 7_1, and to always assist the second DC/DC converter 1_2 with the second battery 7_2.

However, in the automatic driving as described above, since the system drives the vehicle (not shown), the ECU3 can predict when and what kind of load in the main load 6_1 and the backup load 6_2 to be driven. That is, the ECU3 can predict a driven load to be driven in the main load 6_1 and the backup load 6_2. Therefore, the ECU3 uses the travel route information of the navigation system 5 in order to realize prediction of the driven load. For example, as shown in FIG. 3, the travel route information includes stoppable areas such as a safety zone A1 and a safety zone A2 as well as road information on the travel route. The road information includes, for example, two lanes on one side, one lane on one side and road width.

Specifically, the ECU3 divides a region on a map through which the vehicle (not shown) passes based on the travel route information into the travel areas X(0) to X(10). Each of the travel areas X(0) to X(10) is predicted to pass the vehicle (not shown) during traveling, and is any one of a rectilinear area X_1 and an intersection area X_2. The rectilinear area X_1 is further finely classified based on the road information. For example, two lanes on one side and one lane on one side are different rectilinear areas X_1. For example, in the example in FIG. 3, the travel area X(0) and the travel area X(2) have different road widths, but are both rectilinear areas X_1. In the example in FIG. 3, the travel areas X(0), X(2), X(4), X(5), X(7) and X(9) correspond to rectilinear areas X_1. Among the travel areas X(0), X(2), X(4), X(5), X(7) and X(9), the travel area X(4) is allocated to the safe zone A1 and the travel area X(7) is allocated to the safe zone A2. The travel areas X(1), X(3), X(6), X(8) and X(10) correspond to intersection areas X_2.

The travel area X(4) is allocated to the safety zone A1, whereby when an abnormality occurs in electric power sources such as the first battery 7_1 and the second battery 7_2 while the vehicle (not shown) is moving from the travel areas X(0) to X(3), the vehicle (not shown) is safely moved to the travel area X(4), that is, to the safe zone A1, and is stopped. Therefore, since the vehicle (not shown) travels until reaching the safe zone A1, backup required electric power Pa1 including an amount for travelling to the safe zone A1 can be derived by allocating the travel area X(4) to the safe zone A1, as will be described below. The same applies to the travel area X(7). Each of the travel areas X(0) to X(10) is referred to as a travel area X unless particularly limited.

The ECU3 predicts a driven load to be driven in the backup load 6_2 for each travel area X divided as described above. The ECU3 derives electric power used for the driven load for each travel area X. A current point S, midway points a1 and a2, and a target point G exist between the travel areas X(0) and X(10) as travel points of the vehicle (not shown). Therefore, the ECU3 derives the assumed output capacity for each travel point after deriving electric power used for the driven load up to the midway point a1, electric power used for the driven load up to the midway point a2, and electric power used for the driven load up to the target point G, based on electric power used for the driven load derived for each travel area X.

The assumed output capacity is a capacity that can supply the electric power used for the driven load in the backup load 6_2 at the travel points that are up to midway of a moving distance of the vehicle (not shown) from the current point S to the current point G, and is set to be lower than a threshold battery capacity that is lower than in a fully charged state of the second battery 7_2. The travel point is included in a part of the travel areas X analyzed based on the travel route information. Each of the travel areas X is predicted to pass the vehicle (not shown) during traveling, and is any one of the rectilinear area X_1 and the intersection area X_2.

Figure 4:
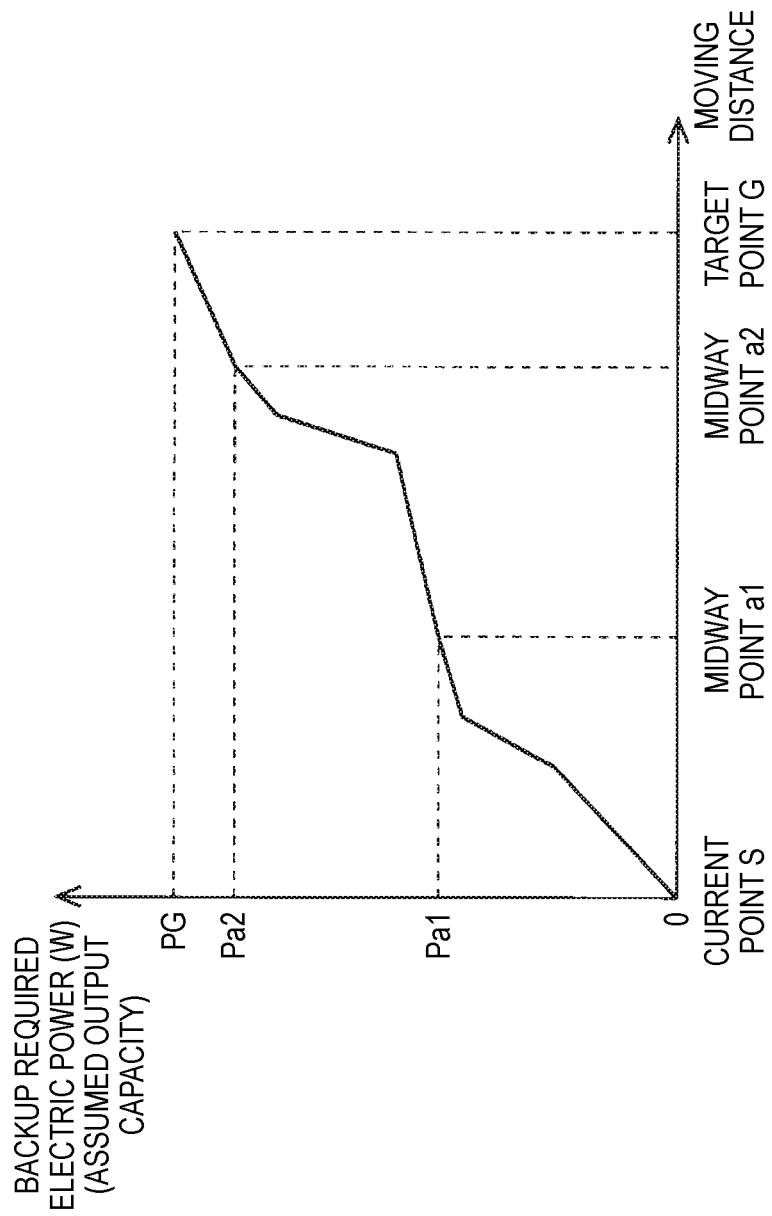
FIG. 4 is a diagram showing an example of a prediction map of assumed output capacity at travel points according to the embodiment to which the present disclosure is applied.

Next, processing for controlling a charged state of the backup load 6_2 by controlling the output voltage of the second DC/DC converter 1_2 according to the assumed output capacity will be described with reference to FIGS. 4 to 6. FIG. 4 is a diagram showing an example of a prediction map of assumed output capacity at the travel points according to the embodiment to which the present disclosure is applied. FIG. 5 is a diagram showing an example of a determination table of a charge amount target value according to the embodiment to which the present disclosure is applied.

First, as described above, the ECU3 derives the electric power used for the driven load for each travel area X executed based on the travel route information. The electric power used for the driven load includes electric power consumption generated, for example, when the vehicle (not shown) turns right at an intersection, by a brake operation required for stopping the vehicle, an action of an electric power steering device for turning right at the intersection, lighting of a signal lamp and the like. The ECU3 derives the assumed output capacity for each travel point based on the electric power used for such a driven load. For example, the backup required electric power Pa1 that is the electric power required up to the midway point a1 is a sum of the total electric power used in the travel areas X required up to the midway point a1. Similarly, the ECU3 derives a backup required electric power Pa2 and a backup required electric power PG respectively for the midway point a2 and the target point G as well. That is, the EUC3 derives the total electric power used in the plurality of travel areas X for each travel point. Derivation timing may be during traveling of the vehicle (not shown). FIG. 4 shows the example of the assumed output capacity that can supply the total electric power used for each travel point, and FIG. 5 shows the example of the charge amount target value determined from the assumed output capacities. As shown in FIG. 4, the backup required electric power Pa1 is the sum of the total electric power used from the current point S to the midway point a1, and is an assumed output capacity in the travel areas X(0) to X (3) as shown in FIG. 5. Similarly, as shown in FIG. 4, the backup required electric power Pa2 is a sum of the total electric power used from the midway point a 1 to the midway point a2, and is an assumed output capacity in the travel areas X(3) to X (7) as shown in FIG. 5. Similarly, as shown in FIG. 4, the backup required electric power PG is a sum of the total electric power used from the midway point a2 to the target point G, and is an assumed output capacity in the travel areas X(7) to X(10) as shown in FIG. 5. As shown in FIG. 4, each travel point is mapped, the backup required electric powers Pa1, Pa2 and PG for each travel point are visualized, and by performing charge and discharge control of the second battery 7_2 by using the backup required electric powers Pa1, Pa2 and PG for each travel point, the ECU3 can derive a minimum required capacity that can reach the target point G even when a main electric power source (not shown) fails. Therefore, the EUC3 performs charge and discharge control of the second battery 7_2 by controlling the switch 9, sets a maximum value of the assumed output capacity derived from the assumed output capacity for each travel point with any plurality of travel area as a unit as the charge amount target value, causes the vehicle (not shown) to travel while determining whether the charge amount target value exceeds the threshold battery capacity, and reacquires the travel route from the navigation system 5 when the charge amount target value exceeds the threshold battery capacity, whereby automatic driving can be performed with a safe route.

(Action)

Figure 6A:
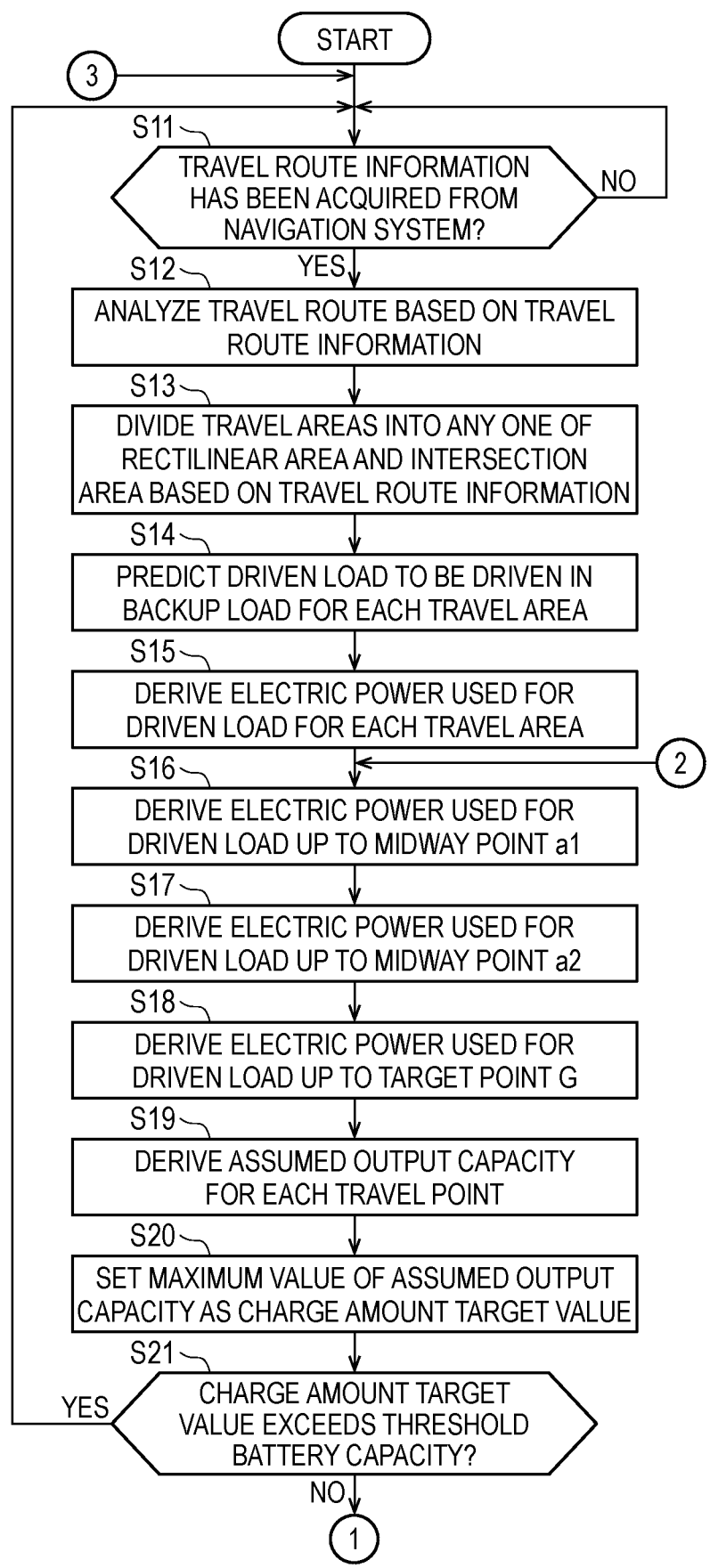
FIGS. 6A and 6B are flowcharts showing a control example of the electric power distribution system according to the embodiment to which the present disclosure is applied.
Figure 6B:
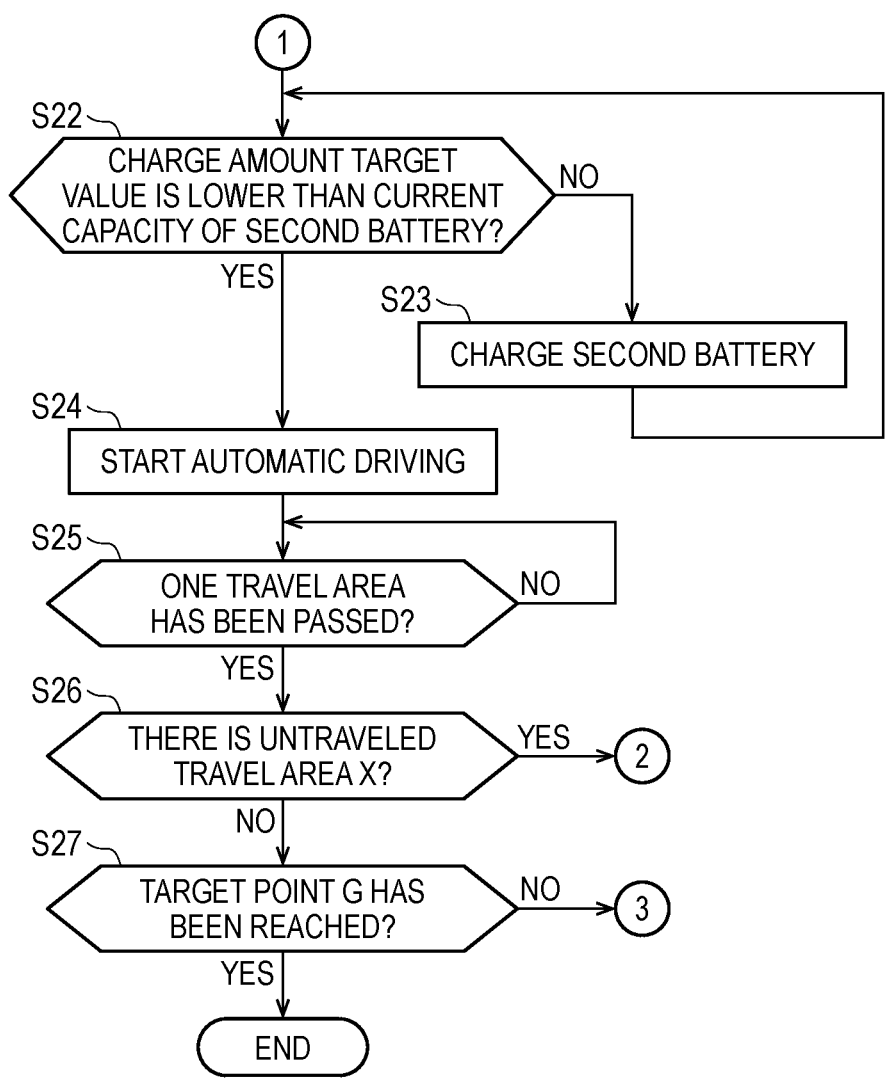

Next, a specific control example will be described with reference to FIGS. 6A and 6B. FIGS. 6A and 6B are flowcharts showing a control example of the electric power distribution system according to the embodiment to which the present disclosure is applied. In step S11, the ECU3 determines whether the travel route information has been acquired from the navigation system 5. When the ECU3 determines that the travel route information has been acquired from the navigation system 5 (step S11; Y), processing proceeds to step S12. When the ECU3 determines that the travel route information has not been acquired from the navigation system 5 (step S11; N), the processing of step S11 is repeated.

In step S12, the ECU3 analyzes the travel route based on the travel route information, and the processing proceeds to step S13. In step S13, the ECU3 divides the travel areas X into any one of the rectilinear area X_1 and the intersection area X_2 based on the travel route information, and the processing proceeds to step S14. The travel area X(4) is a rectilinear area X_1 and corresponds to the safe zone A1. The travel area X(7) is a rectilinear area X_1 and corresponds to the safe zone A2. In step S14, the ECU3 predicts the driven load to be driven in the backup load 6_2 for each travel area X, and the processing proceeds to step S15. In step S15, the ECU3 derives the electric power used for the driven load for each travel area X, and the processing proceeds to step S16.

In step S16, the ECU3 derives the electric power used for the driven load up to the midway point a1, and the processing proceeds to step S17. In step S17, the ECU3 derives the electric power used for the driven load up to the midway point a2, and the processing proceeds to step S18. In step S18, the ECU3 derives the electric power used for the driven load up to the target point G, and the processing proceeds to step S19. In step S19, the ECU3 derives the assumed output capacity for each travel point, and the processing proceeds to step S20. In step S20, the ECU3 sets the maximum value of the assumed output capacity as the charge amount target value, and the processing proceeds to step S21. In step S21, the ECU3 determines whether the charge amount target value exceeds the threshold battery capacity. The threshold battery capacity is set to be lower than in the fully charged state of the second battery 7_2. Therefore, the second battery 7_2 is prevented from being charged to the fully charged state. When the ECU3 determines that the charge amount target value exceeds the threshold battery capacity (step S21; Y), the processing returns to step S11. When the ECU3 determines that the charge amount target value does not exceed the threshold battery capacity (step S21; N), the processing proceeds to step S22.

In step S22, the ECU3 determines whether the charge amount target value is lower than a current capacity of the second battery 7_2. When the ECU3 determines that the charge amount target value is lower than the current capacity of the second battery 7_2 (step S22; Y), the processing proceeds to step S24. When the ECU3 determines that the charge amount target value is not lower than the current capacity of the second battery 7_2 (step S22; N), that is, when the ECU3 determines that the charge amount target value is equal to or greater than the current capacity of the second battery 7_2 (step S22; N), the processing proceeds to step S23. In step S23, the second battery 7_2 is charged, and the processing returns to step S22. In step S24, the ECU3 starts the automatic driving, and the processing proceeds to step S25. That is, the automatic driving is an action permitted after the processing reaches step S24.

In step S25, the ECU3 determines whether one of the travel areas X has been passed. When the ECU3 determines that one of the travel areas X has been passed (step S25; Y), the processing proceeds to step S26. When the ECU3 determines that one of the travel areas X has not been passed (step S25; N), the processing of step S25 is repeated. In step S26, the ECU3 determines whether there is an untraveled travel area X. When the ECU3 determines that there is an untraveled travel area X (step S26; Y), the processing returns to step S16. When the ECU3 determines that there is no untraveled travel area X (step S26; N), the processing proceeds to step S27. In step S27, the ECU3 determines whether the target point G has been reached. When the ECU3 determines that the target point G has been reached (step S27; Y), the processing ends. When the ECU3 determines that the target point G has not been reached (step S27; N), the processing returns to step S11.

(Effects)

From the above description, in the present embodiment, the output voltage of the second DC/DC converter 1_2 is controlled according to the assumed output capacity derived based on the travel route information of the navigation system 5. The assumed output capacity is a capacity that can supply the electric power used for the driven load in the backup load 6_2 at midway points a1 and a2 that are up to midway of the moving distance of the vehicle (not shown) from the current point S to the target point G, and is set to be lower than the threshold battery capacity that is lower than in the fully charged state of the second battery 7_2. Therefore, a battery capacity of the second battery 7_2 in a charged state is lower than that in the fully charged state. Therefore, deterioration of the second battery 7_2 can be prevented.

In the present embodiment, the midway points a1 and a2 are included in a part of the plurality of travel areas X analyzed based on the travel route information. As described above, each of the travel areas X is predicted to pass the vehicle (not shown) during traveling, and is any one of the rectilinear area X_1 and the intersection area X_2. Therefore, the driven load corresponding to each of the travel areas X can be appropriately predicted. Therefore, since accuracy of deriving the electric power used for the driven load can be improved, the assumed output capacity can be appropriately set.

Although the electric power distribution system to which the present disclosure is applied has been described above based on the embodiment, the present disclosure is not limited thereto, and modifications may be made without departing from the spirit of the present disclosure.

For example, in the present embodiment, the level 3 (LV3) and the level 2 (LV2) as automation levels have been described as the automatic driving, but the present invention is not limited thereto. For example, the load may be a load equal to or higher than a level 4 (LV4) as the automation level, or may be a load of the level 1 (LV1) as the automation level.

For example, in the present embodiment, the current point S, the midway points a1 and a2, and the target point G have been described as the travel points, but the present invention is not limited thereto. For example, travel points in midway may be further subdivided to midway points such as midway points a3 to a6 (not shown).

What is claimed is:

1. An electric power distribution system which is mounted on a vehicle, supplies electric power to a main load from a first DC/DC converter and a first battery provided in parallel with the first DC/DC converter, and supplies electric power to a backup load from a second DC/DC converter and a second battery provided in parallel with the second DC/DC converter, the electric power distribution system comprising:
- a first path configured to supply electric power to the main load from at least one of: the first DC/DC converter and the first battery;
- a second path that is provided in parallel with the first path, the second path configured to supply electric power to the backup load from at least one of: the second DC/DC converter and the second battery;
- a third path that connects the second DC/DC converter and the first battery;
- a fourth path that connects the first path and the third path and connects the first battery and the first DC/DC converter in parallel to the main load; and
- a control unit that controls an output voltage of the second DC/DC converter according to an assumed output capacity derived from travel route information of a navigation system mounted on the vehicle, wherein the assumed output capacity is a capacity that is able to supply electric power used for a driven load in the backup load at a travel point that is up to midway of a moving distance of the vehicle from a current point to a target point, and is set to be lower than a threshold battery capacity that is lower than in a fully charged state of the second battery.

2. The electric power distribution system according to claim 1, wherein
- the travel point is included in a part of travel areas analyzed based on the travel route information, and
- each of the travel areas is expected to pass the vehicle during traveling and is one of a rectilinear area and an intersection area.

* * * * *